Dec. 8, 1959   F. J. FONTEIN   2,916,142
PROCESS AND APPARATUS FOR SEPARATING
PARTICLES ACCORDING TO SIZE
Filed Dec. 14, 1954   7 Sheets-Sheet 1
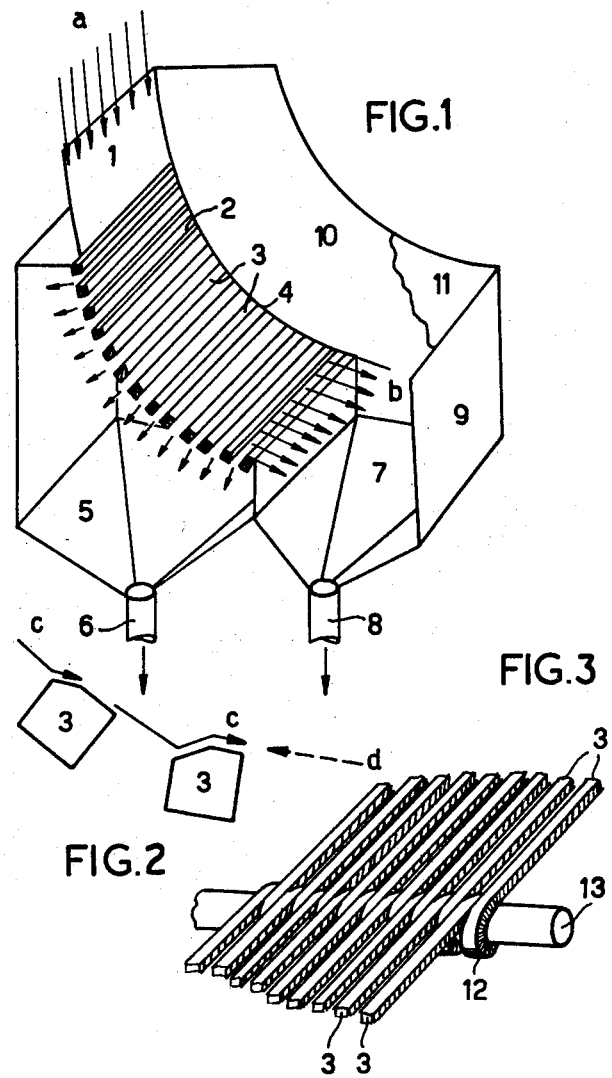

Dec. 8, 1959
F. J. FONTEIN
2,916,142
PROCESS AND APPARATUS FOR SEPARATING
PARTICLES ACCORDING TO SIZE
Filed Dec. 14, 1954
7 Sheets-Sheet 2
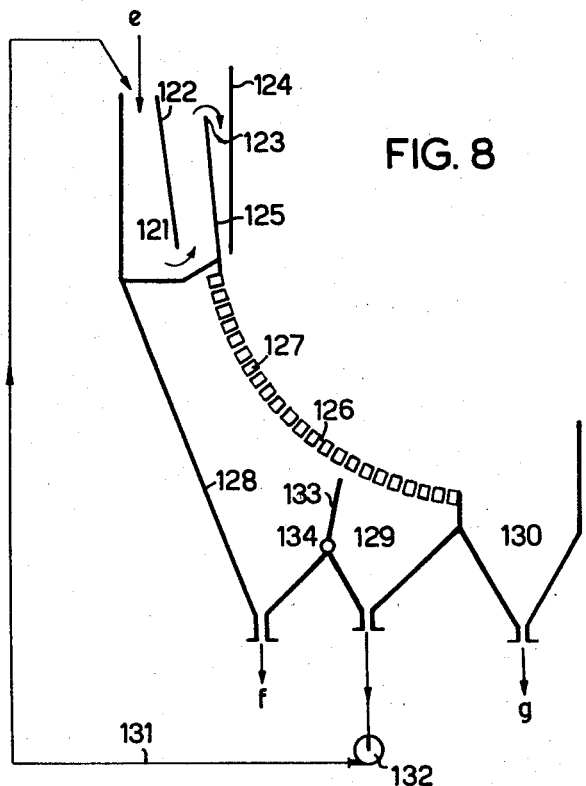
 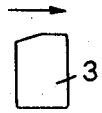 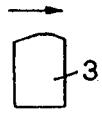 
FIG.4   FIG.5   FIG.6   FIG.7
Inventor
Freerk J. Fontein
By Cushman, Darby & Cushman
Attorneys

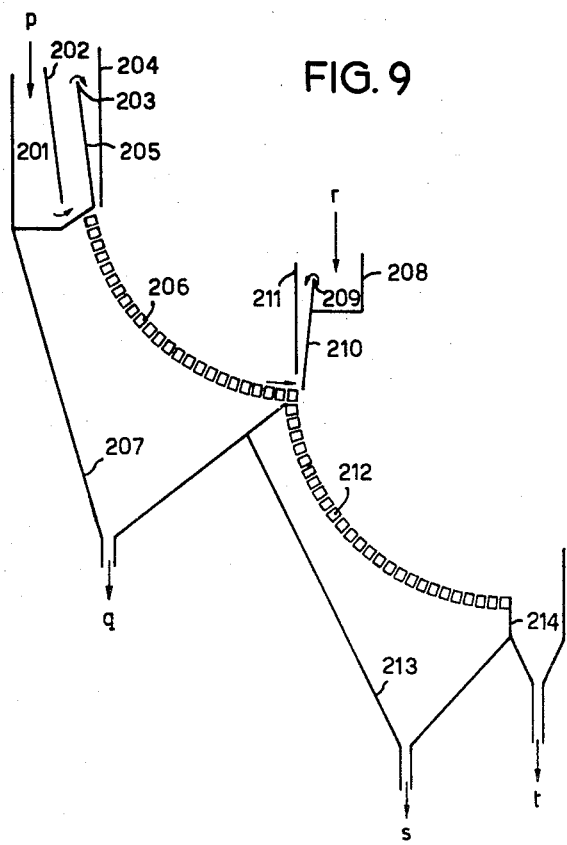

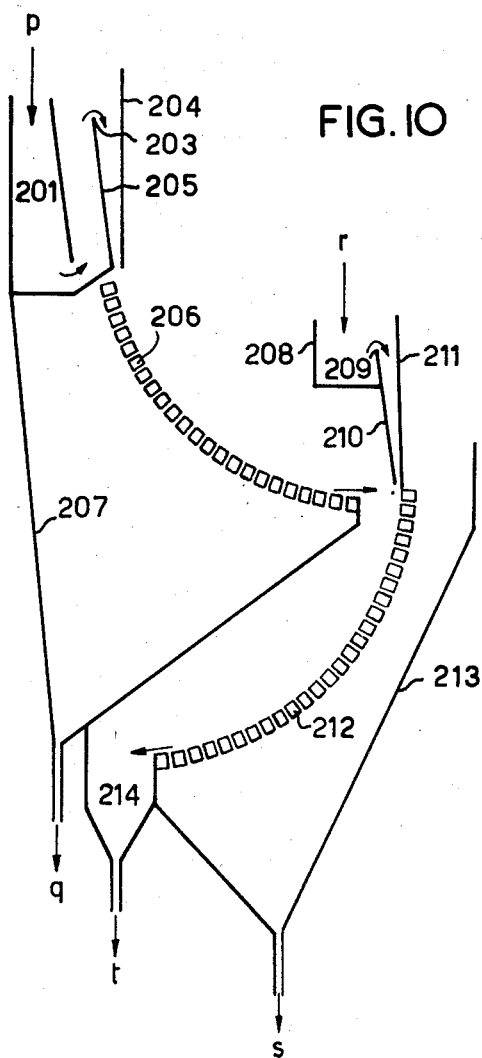

__United States Patent Office__ 2,916,142
Patented Dec. 8, 1959

2,916,142
PROCESS AND APPARATUS FOR SEPARATING PARTICLES ACCORDING TO SIZE

Freerk J. Fontein, Heerlen, Netherlands, assignor to Stamicarbon N.V., Heerlen, Netherlands Application December 14, 1954, Serial No. 475,251

Claims priority, application Netherlands December 24, 1953

19 Claims. (Cl. 209—274)

The invention relates to separation of solids and liquids and more particularly to the wet-screening of solids and liquids by means of a fixed screen for separating solid particles from a liquid or a suspension, for separating liquids and for separating solid particles of different sizes.

While coarse products can be satisfactorily screened on fixed screens, for example, in ore washeries frequent use is made of bar or grizzly screens, the screening of fine-sized products presents many difficulties such as clogging, lowered efficiency, capacity and accuracy, etc. It is therefore customary in the case of fine-sized products to make use of moving screens, such as shaking screens, vibrating screens and rotary screens.

In addition to these, there have been developed fixed screens with a curved screening deck over which the material moves along a curved path so that screening is accomplished by the action of the centrifugal forces. With this screening method, discharging of the overflow sometimes gives rise to difficulties. This is at least partly due to the fact that the material passes over these screens along a spiral-shaped path. Moreover, these screens are rather complicated in construction and have proven to be expensive to produce and maintain.

Accordingly, it is an object of the present invention to provide a novel wet screening procedure whereby it is possible to obtain an accurate separation of the solid particles suspended in the liquid medium.

A further object of the present invention is the provision of a wet screening apparatus which possesses advantages in points of efficiency, duration and mode of operation.

Another object of the present invention is the provision of a wet screening apparatus having an improved fixed screening deck which is simple in construction, occupies but little space at a given capacity and is capable of screening to a finer size than can be achieved with the fixed screens heretofore known.

A still further object of the present invention is the provision of an improved fixed screening deck which is reversible end for end so as to improve its wearing characteristics and prolong its useful life.

Still another object of the present invention is the provision of a novel apparatus and procedure for wet screening a suspended mixture of solid particles whereby a portion of the undersize fraction is collected separately and recirculated so as to obtain a very sharp separation.

A still further object of the present invention is the provision of a novel apparatus and procedure for separating suspended solid particles on a fixed screen whereby equal overpressures may be maintained on both sides of the screen so that the discharge from the apparatus will be under pressure.

These and other objects of the present invention will become more apparent during the course of the following detailed description and appended claims.

The invention may best be understood with reference to the accompanying drawings wherein illustrative embodiments are shown somewhat schematically. In the drawings:

Figure 1 is a cross-sectional perspective view of one embodiment of an apparatus constructed in accordance with the principles of the present invention.

Figure 2 is a cross-sectional view through two bars of the screening deck.

Figure 3 is a fragmentary perspective view showing certain details of construction of the screening deck.

Figures 4–7 are profile views of a screening bar showing the same in progressive stages of wear.

Figures 8–12 are schematic views illustrating modified forms of the screening apparatus shown in Figure 1.

Figure 11:
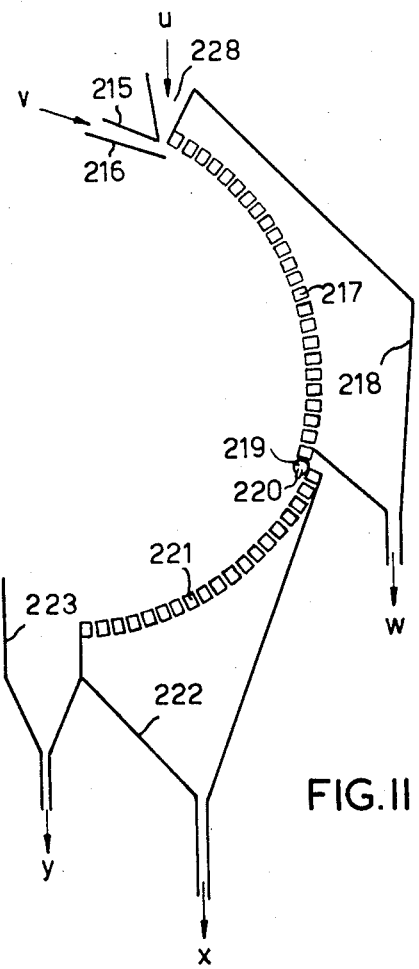

Referring now more particularly to the drawings, there is shown in Figure 1 one embodiment of an apparatus according to the present invention which includes a plate 1 over which the mixture to be separated is supplied in the direction indicated by the arrows a. This plate 1 may be formed, for example, by the bottom of an open trough or a closed channel, or by one of the flat sides of a more or less flatted rubber hose. The plate 1 is tangentially joined to the concave side of a curved screening deck or separating body 2, which is preferably constructed of a plurality of bars 3 spaced apart so as to form a plurality of slits 4. The screening deck is preferably curved so that the bars 3 form the generatrices of a cylinder surface. Stated differently, the screening deck consists of a rectangular grizzly screen which has been bent so that the bars have remained straight but the screening deck has been given a curvature in a plane perpendicular to the bars.

Fine particles and liquid pass through the separating apertures or slits and collect in a reservoir 5 from which they are carried off through a pipe 6. The convex side of the screening deck 2 is entirely shut in by the reservoir 5 so that no losses can occur. Coarse particles move along the screening deck and, upon reaching the delivery end of the deck, are carried off in a direction tangential to the deck and perpendicular to the last bar 3 thereof, as indicated by the arrows b. As shown in Figure 1, these particles collect in reservoir 7 from which they are carried off along a pipe 8. Instead of reservoir 7, it is also possible to use a trough or channel joined to the screening deck. An end wall 9 and a side wall 10 prevent losses through splashing or outflowing of the mixture. Moreover, the entire screen may be shut off by a cover plate 11.

In Figure 1 the bars 3 are shown in a horizontal position and the screening deck constitutes about 65° of a circular cylinder with the feeding end on the higher side and the delivery end for the overflow on the lower.

It is to be understood, however, that the screening deck may be placed in different positions, as will become more apparent hereinafter, it being essential merely that an unobstructed discharge of the undersize is obtained. Discharging of the overflow is dependent on the concentration of the feed, the feed rate, the amount of feed per unit of screen width (or the "thickness" of the feed) and the length of the screening deck. These points must naturally be considered during construction and in service. For example, when the material is being supplied through a rubber hose, the feed rate may be controlled in a simple manner by flattening the hose to a greater or less extent. When mounting the screening deck, every care must be taken to keep the concave side thereof clear of projections, since they tend to interfere with the flow of material therealong. Wherever possible, the fastening means utilized to secure the deck in place should therefore be provided on the convex side so that the concave side of the screening deck may be kept free of all obstructions.

The bars 3 preferably have a rectangular cross section with the corners being slightly rounded off so as to avoid sharp edges. The bars are positioned so that straightening of the screening deck would cause the slits also to become rectangular in profile. When the screening deck is curved, the slits have a trapezoidal cross section.

Figure 2 is a cross section through two bars 3 which have been in use for some time showing the position of the bars with respect to one another and the distance between them strongly exaggerated. Because of the curvature of the screening deck, particles moving across the left-hand bar in the direction of the arrows c will strike against the side of the right-hand bar and thus cause wear at this point. Consequently, the left hand upper edge of all bars will become rounded off after continued operation, thereby reducing the screen's operating efficiency. This drawback may be largely eliminated by reversing the direction of feed with respect to the bars, so that the mixture will travel as indicated by the arrow d. To this end, the screening deck is preferably mounted for end-to-end reversal so that at set intervals the feeding end may become the delivery end and vice versa. In this manner a more uniform wear can be obtained.

Figures 4–7 show the profile of a bar 3 in successive stages of wear before and after reversal has been accomplished. While the inclinations of the wearing surfaces have been greatly exaggerated in the figures, they are quite perceptible to the naked eye. Figure 4 shows a new bar having a rectangular profile and rounded-off corners. Figure 5 shows the bar after considerable use, with the direction of flow as indicated by the arrow. It will be noted that the leading edge has become worn and has been lowered somewhat. Figure 6 illustrates the condition of the bar after reversal of the screening deck and considerable use, with the direction of flow as indicated by the arrow. It will be noted that the opposite edge, now the leading edge, has received a like amount of wear. Figure 7 shows the condition of the same bar after still more use, with the direction of flow the same as in Figure 6 as indicated by the arrow. When the bars are in this condition, the screening deck should be reversed again.

Figure 3 shows a type of grizzly screen which is aptly suited for constructing the screen of the present invention. The bars 3 of this screen are preferably bent so as to form a loop 12 and a connection rod 13 passes through the loops of the successive bars. Each bar 3 comprises at least two loops 12 engaged by a rod 13, the exact number being determined by the length of the bars. Bars constructed in this manner are well known and commercially available.

While the apparatus as described above, hereinafter referred to as a "sieve bend," gives satisfactory results, it has been found that by separately collecting an undersized fraction from the screen portion near the discharge end and subjecting this fraction to a second screening process, preferably on the same screen, a very sharp separation can be achieved.

Figure 8 shows a modified screening apparatus for accomplishing this purpose. The suspension to be separated, e, is supplied to an overflow reservoir 121 having a partition 122 and an outer wall 125 providing an overflow edge 123 which extends over the full width of the screening deck. Disposed opposite the overflow edge 123 is a plate 124, which, together with the outer wall 125 operates to deliver the mixture along a tangential path to a curved screening deck 126 composed of the bars 127, similar to bars 3 previously described. The screening deck 126 may be fastened in place by any suitable means which will permit it to be reversed in a simple manner, so that the discharge end becomes the feed end and the feed end becomes the discharge end.

A collecting hopper 128 is preferably disposed adjacent the first portion of the convex side of the screening deck and another collecting hopper 129 is disposed adjacent the last portion of the convex side of the screening deck. The overflow from the screen is collected in a collecting hopper 130 disposed at the discharge end thereof. The collecting hopper 129 may be provided with a discharge pipe 131, which, via a pump 132 leads to the overflow reservoir 121. The collecting hoppers 128 and 129 are preferably separated by a plate 133 adjustably mounted about pivotal axis 134 so that a portion of the undersize from from the screen can be supplied to the collecting hopper 128 or to the collecting hopper 129 as may be desired.

In practice the suspension to be separated e is supplied to the overflow reservoir 121 and delivered along a tangential path to the screening deck 126 at a rate of at least 50 cm. per second, in such a way as to be equally distributed over the width of the screening deck 126. On each of the bars a thin layer is scraped off from the current of suspension. As can be deduced from the results, the thickness of said layer normally amounts to about ¼ of the width of the slit between two bars. A solid particle which is at least half immersed in said layer, will be entrained and pass through the slit. The biggest particle that can get into such a slit would therefore have a diameter of twice the thickness of the scraped-off layers, which implies that this diameter is normally equal to 2 x ¼ or ½ the width of the slit.

On the following bars further layers are successively scraped off, with the obvious result that the concentration of coarse particles in the remaining suspension increases steadily. Finally this remaining suspension is collected in the hopper 130 and discharged at g.

Since the amount of solids decreases from the feed end towards the discharge end, the wear will be greatest near the feed end. The wear will initially attack any uneven spots in the screening deck with the result that the screening effect is improved. Next, the front edges of the bars wear away as shown in the Figures 4–7. In consequence the thickness of the layer scraped off on the bars diminishes, with the result that the particle size of separation decreases as well, since this particle size of separation is proportionate to the thickness of the scraped-off layer. By reversing the screening deck, this drawback can be eliminated so that a relatively constant screening effect is obtained.

However, after the screening deck has been reversed, the bars that have only been subjected to relatively little wear are located near the feed end, while the bars with relatively severe wear are located near the discharge end. In the vicinity of the discharge end the particle size of separation will therefore always be larger than near the feed end. Thus, by recirculating the undersize from the last section or by subjecting it to a treatment on a second screen, the sharpness of separation will be enhanced.

According to Figure 8, the undersize *f* from the first portion of the screen, which is the fine fraction, is carried off separately. The undersize from the last portion of the screen is returned to the overflow reservoir 121 through pipe 131 by pump 132. Since conditions slightly change as the wear increases, the position of the wall between the collecting hoppers 128 and 129 may be varied accordingly by pivoting the hinged plate 133 into different positions of adjustment. With the process described in the foregoing surprisingly good results have been obtained.

*Example*

Sand, sp. gr. 2.7 suspended in water, was screened in an apparatus as shown in Figure 8.

The screening deck was composed of screening bars with a width of 2 mm. and slits with a width of 1 mm., the bars running horizontal. A vertical section of the screen surface resembled a quarter circle with a radius of 500 mm., the tangent to the feed end being disposed vertically. The width of the screening deck was 250 mm. The collecting hoppers were so arranged that the undersize from the upper 60° of the sieve bend dropped into the collecting hoppers 128, the undersize from the lower 30° of the sieve bend being delivered into the collecting hopper 129. The overflow edge 123 was at a height of 500 mm. over the upper edge of the screening deck, the distance between the plate 124 and the outer wall 125 being 30 mm. The following results were obtained:

| | |
|---|---|
| Feed (*e*) _____ m.³/hr__ | 57.49 |
| Solids in feed _____ gr./l__ | 176 |
| Undersize (*f*) _____ m.³/hr__ | 54.47 |
| Solids in undersize _____ gr./l__ | 133 |
| Oversize (*g*) _____ m.³/hr__ | 3.02 |
| Solids in oversize _____ gr./l__ | 949 |

Particle size distribution of solids in the separated fractions:

| | Undersize (f), percent | Oversize (g), percent |
|---|---|---|
| bigger than 1,000 microns | 0.01 | 43.7 |
| 500–1,000 | 0.29 | 26.0 |
| 350–500 | 3.6 | 18.0 |
| 210–350 | 22.7 | 7.2 |
| 105–210 | 25.4 | 1.8 |
| smaller than 105 microns | 48.0 | 3.3 |
| | 100 | 100 |

From these results it can be deduced that the diameters of the 50% and the 95% grain were 400 and 520 microns respectively (the diameters of the 50% and the 95% grains are the diameters of the grains of which 50% and 95% respectively from the feed were discharged with the oversize fraction). Consequently, the ratio of the diameter of the 50% grain to that of the 95% grain was 400/520=0.77 and the "Steinmetzer-error" (see "Gluck Auf," 77, pp. 121–128 and 137–146, Heft 8 and 9, J. Steinmetzer, "Die Windsichtung der Feinkohle") amounted to 9%.

The ratio between the diameters of the 50% and 95% grains, and the "Steinmetzer-error" are indications of the sharpness of separation. Two tests, carried out with corresponding material under corresponding conditions but in which the two undersize fractions were brought together, yielded ratios of 0.47 and 0.48 and a "Steinmetzer-error" of 11% and 13%. This shows that with the apparatus of Figure 8 a considerably sharper separation can be achieved than with an apparatus which gives a single undersize fraction only.

In Figure 9 another embodiment of an apparatus constructed in accordance with the principles of the present invention is shown wherein a liquid suspension of solid particles to be separated is supplied at *p* to an overflow tank 201, similar to tank 121 previously described. The suspension is separated into two compartments by means of a partition 202 in such a way that the mixture has to pass underneath the partition 202 to reach an overflow edge 203. Outside the overflow tank 201 and opposite the overflow edge 203, there is provided a plate 204 which, in cooperation with the wall 205 of the overflow tank 201, feeds the mixture along a tangential path to a screening deck 206 constituted in the manner heretofore noted. As before the tank 201, the overflow edge 203 and the plate 204 are of the same width as the screening deck 206. The undersize from the sieve bend collects in a collecting reservoir 207 and is carried off at *q*.

At *r* water is fed into an overflow tank 208 disposed substantially perpendicular to the direction of discharge flow at the discharge end of the screening deck. The water flows across an overflow edge 209 and is supplied along a tangential path to a second screening deck 212 by the plates 210 and 211. The upper end of the screening deck 212 is directly joined to the discharge end of the screening deck 206 and coincides therewith as much as possible. The overflow from the screening deck 206 consequently gets into the liquid current from the overflow tank 208 preferably on the screen side thereof. The plate 210 extends to a spot just opposite the discharge end of the screening deck 206 so as to prevent particles from passing right through the water current. The particles are entrained by the water current and are consequently washed out on the screening deck 212.

The undersize from the screening deck 212 is collected in a collecting reservoir 213 and carried off at *s*. The overflow from the screening deck 212 collects in a collecting reservoir 214 and is carried off at *t*. The apparatus illustrated in Figure 9 may be used, for example, in a heavy medium washery, in which case the screening deck 206 serves as a draining screen and the screening deck 212 as (primary) washing screen.

A further modified apparatus is shown in Figure 10 which corresponds to the apparatus of Figure 9 except for the following differences. The screening deck 212 has been turned through 180° around a vertical axis, so that, as can be seen from Figure 10, the convex side of the screening deck 212 faces in one direction while the convex side of the screening deck 206 faces in the opposite direction. In Figure 9, the convex sides of both screening decks face in the same direction. As a result, the decks of Figure 10 are joined in a slightly different manner than those of Figure 9. As shown in Figure 10, the discharge end of the screening deck 206 is opposite the feed end of the screening deck 212. The plate 210 terminates over the discharge end of the screening deck 206 so that the oversize from said screening deck is carried off below the lower edge of the plate 210 and, at the feeding end of the screening deck 212, can be caught by the water current issuing from the overflow tank 208.

A still further modified apparatus is shown in Figure 11 wherein the mixture to be separated is supplied at *u* and the water separately at *v*. The water *v* flows through the passage between a pair of plates 215 and 216 along a tangential path towards the screening deck 217. The mixture to be separated slides through a feeder funnel 228 into the water current. The plate 216 reaches under the feeder funnel 228, so that the material to be separated cannot fall through the water current. The undersize from the screening deck 217 is collected in a collecting tank 218 and carried off at *w*. At the discharge end of the screening deck 217 there is a spraying device 219 which may take the form of a pipe running parallel to the generatrix of the screening deck 217 and provided with spray apertures 220 arranged in tangential relationship to screening deck 221.

The screening decks 217 and 221 preferably have their convex sides turned in the same direction and are joined so that the overflow from the screening deck 217 will get into the liquid current from the spraying device 219 and will be entrained by the current. The undersize from the screening deck 221 is collected in a collecting tank 222 and carried off at *x*. The overflow from the screening deck 221 is collected in the collecting tank 223 and carried off at *y*.

Figure 12:
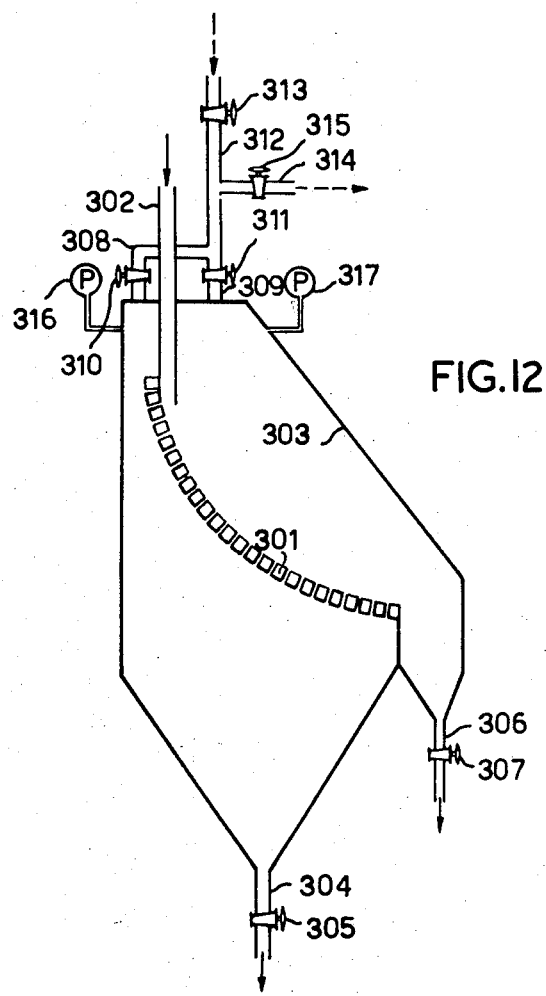

Figure 12 shows still another embodiment of an apparatus according to the invention. In this figure, a screening deck 301, constructed as above, is mounted within an air and watertight housing 303. The screening deck 301 is fed by a tangentially connected feed pipe 302 which may consist of a number of contiguous pipes extending across the entire width of the screening deck. However, it is to be noted that clearances may be left between the pipes and/or between the pipes and the side wall of the apparatus. Where this construction is utilized, the pressures in the spaces over and under the screening deck may then remain in equilibrium with each other by virtue of these clearances. The material may also be supplied through a slitlike aperture and, in that case, it is desirable to provide elements for equally distributing the infed mixture across the entire width of the slit in order that the screen be also equally loaded. Extending from the housing 303 is a discharge pipe 304 having a control valve 305 therein for the undersize, and a discharge pipe 306 having a control valve 307 therein for the overflow. At the feed end of the housing, a pair of pipes 308 and 309, having control valves 310 and 311, respectively are provided on either side of the feed pipe 302. The two pipes 308 and 309 communicate through a pipe 312 and an air-vent pipe 314, with a valve 315 and, as shown, may also be connected with a source of compressed gas or with a liquid under pressure through a pipe 312 and a valve 313. In addition, the housing 303 is fitted on either side of the feed pipe 302 with suitable pressure meters 316 and 317.

The housing 303 may be entirely filled with liquid by removing the air present in the housing by opening the valves 310, 311 and 315. When the housing 303 is entirely filled with liquid, the pressure in the housing may be controlled by means of the valves 305 and 307, which should be adjusted so that the pressures over and under the screening deck become equal to one another. If necessary, extra water may be supplied under pressure through the pipes 312, 308 and 309. The pressures over and under the screening deck 301 may then also be determined by the adjustment of the valves 310 and 311. When the housing is completely filled with liquid, it is preferable to connect the feeding means 302 over the entire width to the screening deck, so that the housing becomes divided into two compartments by the feeding means and the spaces over and under the screening deck cannot be short-circuited. However, this is not necessary.

It is also possible to operate with an air-cushion present in the housing 303. In that case, the valve 315 remains closed and the valves 310 and 311 are left open so that the pressures in the spaces over and under the screening deck remain in equilibrium with each other by virtue of the pipes 308 and 309. If openings are provided in the feeding means which connect the spaces over and under the screening deck with each other, the pressure will remain in equilibrium when the valves 310 and 311 are closed. Moreover, extra air or another gas may be supplied under pressure, in which case the housing 303 may be kept largely filled with gas.

In all instances it is of great importance to keep the pressures in the spaces over and under the screening deck 301 substantially equal since otherwise, the screening process is influenced. It will be understood that should there be an overpressure over the screening deck, the particles will be forced through the screen, which involves the danger of obstruction whereas in the event an underpressure should exist over the screening deck, the particles will have difficulty in passing through the slits.

The fractions leaving through the pipes 304 and 306 are carried off under pressure. This pressure may be utilized for raising the fractions to a higher level or for operating a hydrocyclone or a following sieve bend. This makes it possible to carry out various operations without any intermediate pumps and storage tanks being required. Further, the successive operations can be carried out without the products coming into contact with air so that a hygienic process is obtainable. If only the undersize of the screen has to be treated further it may be recommendable to discharge the overflow via a star wheel or a similar sluice device.

By way of example, a few dimensions of successfully tested sieve bends with slit-like apertures, whose screening decks have the shape of cylinder surfaces with circular cross sections, are listed below.

(1) Radius of curvature 400 mm., central angle 180°, breadth of screening deck 300 mm.
(2) Radius of curvature 510 mm., central angle 90°, breadth of screening deck 1200 mm.

The radii of curvature may also be larger or smaller than those mentioned above and may vary from say 15 to 150 cm. Moreover, the central angle may also be smaller, for example, 45°. If desired, the central angle may be made greater than 90°, although this does not offer an advantage as a rule.

Figure 13:
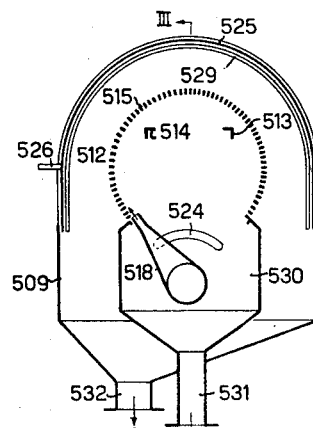
Figure 13 is a schematic transverse vertical sectional view illustrating a modified apparatus arranged to effect a reversal of flow across the screening deck and showing the apparatus in one position of operation.
Figure 15:
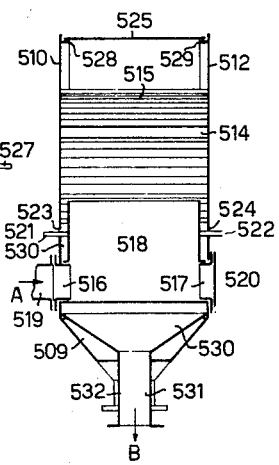
Figure 15 is a schematic, longitudinal vertical sectional view of the modified apparatus of Figure 13.
Figure 14:
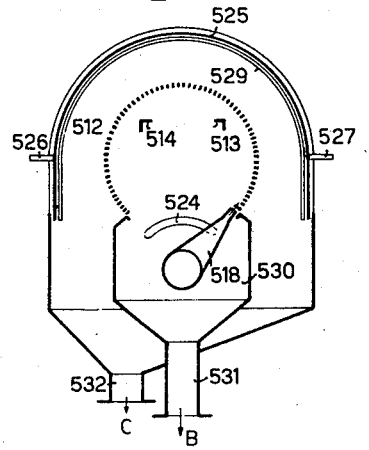
Figure 14 is a view similar to Figure 13 showing the modified apparatus in a reversed position of operation.

While, as mentioned above, the screening deck itself may be reversed so that the direction of flow with respect to the screening deck is reversed, it is within the contemplation of the present invention to provide an apparatus having a fixed non-reversible screen and to reverse the direction of flow thereacross. Referring now to Figures 13–15, there is shown one embodiment of an apparatus for carrying out this function. In Figure 13, there is shown a tank 509 having side walls 510 and 512, which are connected together by suitable stiffening elements 513 and 514. Disposed between the side walls 510 and 512 is a screening deck 515 constructed in the manner described above, which is circular in shape and forms an arc of about 270° with its plane of symmetry positioned vertically and with the open side disposed at the bottom. Disposed in the side walls in opposed relation is a pair of hollow journals 516 and 517 having their center lines disposed on a common axis disposed in the plane of symmetry of the screening deck. A movable supply device 518 is mounted between the journals 516 and 517 for pivotal movement between two operative positions hereinafter to be more fully described. The hollow journal 516 has connected therewith a conduit 519 through which a suspension, indicated at A, is fed into the supply device 518. The hollow journal 517 may be closed as by a blind flange 520. The supply device 518 serves to feed or supply the suspension tangentially onto the screening deck 515, and is equipped with handles 521, 522 which project outside the tank 509 through suitable slots 523, 524. By moving the handles 521 and 522 of the supply device 518, the latter may be brought into the position shown in Figure 13 wherein the suspension is supplied to the left hand end of the screening deck, and discharges from the right hand end thereof or into the position shown in Figure 14″ wherein the suspension is supplied to the right hand end of the screening deck and discharges from the left hand end thereof. When the supply device is moved from one position into the other, it is turned through an angle of approximately 90°. The space between the side walls 510 and 512 is closed by a hood 525 provided with suitable handles 526, 527 which serve as a convenient means for removing the hood from between the side walls. The hood 525 is supported on ledges or flanges 528, 529 extending inwardly from the respective side walls and which serve to seal the openings between the hood and the side walls.

The oversize from the screening deck 515 is collected in a vessel 530 and removed from the apparatus at B through a conduit 531. The undersize is caught by the hood 525 collected in tank 509, and removed at present through a conduit 532.

Part of the undersize passing through the upper part of the screening deck 515 can be sprayed against the hood 525 and fall back into the convex side of the screening deck. With this form of apparatus, it is, therefore, necessary to provide for a substantially high rate of supply so that the undersize will flow with sufficient force through the slits in the upper part of the screening deck. If the sieve bend is operated normally, the feed rate will always be sufficiently high. Moreover, the feed or supply rate must naturally be sufficiently high so that the difference in height can be overcome. If the screening deck has a radius of 50 cm., a velocity which corresponds to that produced by a column of the product supplied two meters in height is generally sufficient. In case the product supplied is very viscous, a high supply velocity must be applied, for example, for a radius of 50 cm., a velocity produced by a suspension column four meters in height, is generally sufficient. If the radius is greater, the velocity has to be appropriately higher.

The modified screening apparatus shown in Figures 13–15 is especially useful in those cases where there is greater wear, that is, where the direction of travel of the material with respect to the screening deck must be reversed frequently. When screening highly abrasive material, it has been found that reversal must be affected more than once a day, whereas for less abrasive material, reversal may be restricted to once a week and under such circumstances, the screening deck itself may be reversed if need be. The modified apparatus of Figures 13–15 is particularly suited for screening raw materials used in the preparation of cement, for drilling muds and other sand-containing mixtures.

It is to be understood that the features illustrated in Figures 1–12 may be incorporated in the apparatus of Figures 13–15 wherever possible.

It can thus be seen that there has been provided a novel method of wet-screening solid particles wherein the particles and the suspending liquid are supplied in a substantially tangential direction to the concave side of a cylindrically curved screening deck. In passing from the feed end to the delivery end of the screening deck, the material travels in a plane substantially perpendicular to the generatrix of the cylindrical screening deck surface. Preferably, the process is carried out in such a way that the aforementioned plane is disposed vertically, which implies that the screen is so positioned that the generatrix runs horizontal, and the mixture is supplied to the screen at the rate of at least 0.5 m./sec., but preferably about 2.5 m./sec.

It will also be seen that there has been provided a novel screening apparatus which includes a cylindrically curved screening deck and means whereby a liquid mixture of particles can be supplied to the concave side of the screening deck in a direction substantially tangential thereto and substantially perpendicular to the generatrix thereof. The screening deck of the present invention is non-continuous and means are provided on the convex side thereof for collecting and discharging particles which have passed along the screening deck in a plane perpendicular to the generatrix. Preferably, the screening deck is curved so that a particle in moving from the feed end to the discharge end will travel through an angle of at most 180°. The radius of curvature of the screening deck is preferably equally large at all points thereof so that it resembles part of a cylinder with a circular cross section. However, it is to be understood that the degree of curvature of the screening deck may also be decreased or, if desired, even increased from the feeding end towards the delivery end; so that the term cylinder is used herein in its mathematical sense. In other words, it is used to denote the surface obtained by moving a line parallel to itself, and more specifically, by moving a given line section parallel to itself in such a way that a given point on said line section moves in a plane perpendicular to said line.

As set forth above, the screening deck may be obtained by bending a rectangular screening deck in one direction parallel to one of its sides, for example, through an angle of 90°. It will be clear therefore, that the screen can be constructed in a simple manner and that during operation, the entire screening deck will be loaded. This characteristic differs greatly from the prior art curved fixed screens whose decks are loaded partly or unequally and whose construction is costly and requires considerable material.

A great advantage of the screening deck curved according to the invention is that, by feeding the material at a sufficiently high rate, it is possible to screen to a particle size considerably smaller than the screen aperture. With a 1.3 mm. screen, for example, it is possible to screen to ½ mm., while on a ½ mm. screen the material may be screened to 0.2 mm. This virtually eliminates the obstruction hazard because the particles passing through the apertures have a smaller diameter than the screen apertures. In order to obtain optimum operation it is necessary, however, that the screening deck be relatively smooth. Consequently, wire screens are less suited for application to the present invention, but grizzly screens and plate screens, on the other hand, may be used to advantage. The apertures in the screening deck preferably consist of slits running parallel to the generatrix and the screening deck is preferably constructed of bars of a substantially rectangular profile, the bars being so positioned that the slits too will have a substantially rectangular profile. (As the screening deck is curved, the slits left between the rectangular bars are actually trapezoidal, the deviation from the rectangular shape being small, however.) This is only of significance for the concave side of the screening deck; it is insignificant, of course, whether the bars on the convex side are rectangular or trapezoidal as long as the slits are not narrowed. Generally, the bars of grizzly screens are given a trapezoidal profile with a view to prevent the particles from getting jammed between the bars. With the screen according to the invention there is no danger of obstruction, so that the bars need not be given a trapezoidal profile. This is advantageous because the screen according to the invention is subject to excessive wear owing to its large capacity. In case the slits should have a trapezoidal profile they would gradually widen, for which reason, a rectangular profile is to be preferred.

Another important point is that the width of the slits must be either of the same order or smaller than the width of the bars. Especially when it is desired to screen to a fine particle size, it is recommendable to use grizzly screens with bars running perpendicular to the direction of transport. For, in this manner, it is possible to obtain narrow slits without impairing the strength of the screening deck. Consequently, one of the principal advantages of the screen according to the invention is that the screening deck can be constructed in a simple manner of a plurality of straight bars of sufficient strength which at all points are perpendicular to the direction of the transport. Perforated plates, with narrow apertures as made at present, have been found too thin.

As noted above, the wear of the screening deck of the present invention is not equally severe at all points, the front edges of the bars wearing away more rapidly than the back edges. Consequently, the efficiency of the screens may decrease considerably in the long run. However, this may be prevented by reversing the screening deck of the screen so that the original feeding end becomes the delivery end and the original delivery end becomes the feeding end. In this way the bars will wear away in a substantially uniform manner so that their useful life will be greatly enhanced. To this end, the screening deck must be sufficiently thick, which condition can be easily satisfied in the case of grizzly screens. Further, it is advisable to construct the bars of some wear resistant material.

When using a perforated plate it is essential that the edges of the apertures be free of burrs or that the burrs occur only on the lower side (the convex side) of the screening deck. Even very small burrs may have a large effect on the efficiency of the screen, this effect being temporary, as burrs and unevennesses will be worn away quickly when the apparatus is being used. In this manner, the screening deck of the present invention affords a self-regulating effect whereby small irregularities will be worn down so as to improve the efficiency thereof. Larger irregularities will also wear down, however, as a result thereof, the screening deck may assume a rather irregular appearance. This, however, does not effect the quality of the operation.

The screening bars near the feed end of the screening deck wear away faster than the screening bars near the delivery end. In consequence, the particle size of screening near the delivery end is slightly larger than this size near the feed end. If a very sharp separation is required, it is, therefore, advisable to collect separately the undersize obtained from the portion of the screening deck near the delivery end and to subject it to a second screening treatment, as by returning this undersize fraction to the same screen.

Under certain conditions it may furthermore be advisable to create and maintain equal overpressures over and under the screening deck. The advantage presented hereby is that the separated fractions are discharged from the screening apparatus under pressure. This pressure may be utilized, for example, in conveying the separated fractions to a higher level, or for feeding a hydrocyclone or a following screening deck.

The screen according to the invention can be constructed in a simple manner, occupies but little space at a given capacity and is capable of screening to a finer size than can be achieved with the customary screens. This makes it possible to use the screen for special applications, some of which are listed below by way of example:

(1) In the starch industry, in substitution of the costly silk gauze or nylon screens.

(2) In coal and ore washeries:

(a) Whereas in some separation processes particles bigger than say 0.1 mm. are separated according to specific gravity, smaller particles cannot be removed in this manner. These finer particles are difficult to separate from the coarser particles and are consequently left behind as impurities in coarser products. If this gives rise to an insurmountable problem, a different mode of separation must be employed. By applying this invention, however, the finer particles may be removed easily. This is of special importance in dealing with the overflow fraction obtained from a so-called "cyclone washer with water."

(b) In the application of the sink-and-float-process, the separated products are passed over vibrating screens (draining screens) where the separating suspension is removed from the separated products. Subsequently, the products are passed over a washing screen for removing the adhering suspension. Frequently, these treatments are carried out on one screen with two collecting reservoirs, in which case the first part of the screen is used as a draining screen and the second part serves as a washing screen. Many advantages can be attained if, instead of applying this procedure, the material is allowed to drain, at least substantially, on a screen according to the invention and to subject the overflow obtained therefrom to a further treatment on a short vibrating screen. Further, it is possible in a sink-and-float washery, where a suspension of magnetic material is being employed, to pass the dilute suspension over a screen according to the invention and to subject only the overflow obtained therefrom to a treatment in a magnetic separator. Another possibility is to classify this diluted suspension in a hydrocyclone in such a way that the larger portion of the magnetic material will get into the overflow fraction and the apex fraction is subjected to one or two after-treatments on a screen according to the invention for removing the coarse non-magnetic particles; the fine non-magnetic particles may then be removed in a thickener. With this procedure no magnetic separators need be used.

The undiluted but contaminated suspension obtained from a draining screen may also be returned to the suspension bath after the coarse impurities have been removed in a screen according to the invention. These coarse impurities may then be separated, for example, in a hydrocyclone, and the resulting fractions be screened again on a screen.

In general, the most important application of the present invention is in screening at a size between 25 microns and 1 mm. Of course, particles larger than 1 mm. can be separated with the present invention; however, conventional means are also satisfactory at these larger sizes.

It is, therefore, possible to utilize the present invention to separate according to sizes where previous means, such as classifiers, centrifuges, and the like have been used to less advantage. Classifiers separate according to settling rate, the settling rate depending on specific gravity, size and shape of particles. If the particles have the same shape and specific gravity, the classifier separates according to size. Whereas, if the particles do not have the same specific gravity or shape, the particles which have the higher specific gravity and the rounder shape will be separated according to a finer size. In many cases therefore, the method and apparatus of the present invention may be used to great advantage in place of classifiers heretofore utilized, for instance in closed circuit grinding. Likewise, in many instances, centrifuges, such as those heretofore used to separate particles of at least 25 microns from a liquid which may also contain fine particles, may be readily replaced by the present invention. Thus, it is possible to separate crystals from a solution by means of the present invention, and then to recycle the crystals which are too small.

It is to be understood that the forms of the invention herewith shown and described are to be taken as the preferred embodiments of the same and various changes may be made without departing from the scope of the appended claims.

I claim:

1. A process of separating a mixture of particles according to size which comprises the steps of establishing at a receiving position a flow of particles and a suspending liquid in a layer formation which is straight in a direction perpendicular to the direction of flow; supporting one surface of said layer formation to locally define the direction of flow thereof; interrupting the support of said one surface, along a straight line perpendicular to said defined direction, a fixed distance measured in said defined direction while permitting the unsupported layer formation flow, due to its velocity, to continue substantially in said defined direction; separating, by blocking part of the unsupported layer formation flow along a straight plane parallel to said line, a layer of a thickness of at most of the order of one quarter said fixed distance of support interruption from the one surface of said layer formation flow and hence the liquid and particles therein of a size not greater than of the order of one-half said fixed distance of support interruption, the particles of a size greater than of the order of one-half said fixed distance of support interruption substantially remaining in the layer formation flow; supporting the one surface of the remainder of the layer formation flow to locally define its direction of flow; and successively repeating the steps of interrupting the support, separating a layer by blocking, and supporting the remainder throughout the entire width of the layer formation along a relatively smooth path between said receiving position and a spaced discharge position.

2. A process as defined in claim 1 wherein said path generally conforms to a cylindrically curved plane, the axis of curvature of which at any point is located on the side of the layer formation flow opposite the intermittently supported surface thereof.

3. A process as defined in claim 2 wherein said cylindrically-curved plane is uniformly curved about a single horizontal axis of curvature.

4. A process as defined in claim 1 wherein the layer formation flow of particles and suspending liquid established at said receiving position has a minimum velocity of at least 0.5 meters per second.

5. A process as defined in claim 1 wherein the separated layers are collected in at least two separate portions along said path, the portion collected along said path near the discharge position thereof being returned to the receiving position to form a part of the layer formation flow established therein.

6. A process as defined in claim 1 wherein the layer formation flow of particles and suspending liquid is established at said receiving position by separately feeding the suspending liquid in said defined direction to said receiving position in layer formation and feeding the particles into the said separately fed liquid so as to be entrained therein.

7. Apparatus for separating particles according to size comprising a separating body along which a layer formation flow of particles and a suspending liquid is passed between a feed end thereof and a discharge end thereof, said separating body including a plurality of elements fixedly mounted with respect to each other between said feed and discharge ends, each of said elements having a supporting surface for engaging one surface of the layer formation flow of particles and liquid passing thereby to locally define the direction of flow thereof, the supporting surfaces of said elements between said feed and discharge ends generally conforming to a relatively smooth cylindrically curved plane, each of said elements also having a separating surface facing in a direction opposed to the local direction of flow and disposed in a transverse plane intersecting the plane of the associated separating surface along a line perpendicular to the direction of flow, the separating surface of each element being spaced from the adjacent upstream element to define therewith a separating aperture having a substantially constant width of a dimension measured in the local direction of flow not greater than the dimension of the associated element measured in the local direction of flow, and means for feeding particles and a suspending liquid in layer formation onto the feed end of said separating body in a direction substantially tangential to said generally conforming plane of the supporting surface and perpendicular to said intersecting line of the separating surface of the elements adjacent thereto, the rate and direction of flow along the supporting surface of each element being such that the separating surface of the succeeding element which defines therewith an associated separating aperture will block from the surface of the layer formation flow engaged by the supporting surface a thin layer of a thickness at most of the order of one-quarter of the width of the associated separating aperture so that the liquid in successive blocked layers together with the particles entrained therein of a size not greater than of the order of one-half the width of the associated separating apertures will pass through the latter and the remaining liquid and particles will pass on to the discharge end of said separating body.

8. Apparatus as defined in claim 7 wherein said elements comprise a plurality of elongated bars having a cross-sectional configuration substantially symmetrical with respect to a longitudinal plane perpendicular to the associated separating surface thereof.

9. Apparatus as defined in claim 7 including means fixed with respect to said feeding means for collecting and discharging the particles and liquid passing through said apertures, said separating body being carried by said collecting and discharging means for end-to-end reversal with respect to said feeding means.

10. Apparatus as defined in claim 7 wherein means is provided adjacent the discharge end of said separating body on the side thereof remote from the separating surfaces of the elements thereof for separately collecting an undersize fraction of particles and liquid passing through the apertures of a portion of the separating body adjacent said discharge end, and means connecting said separate fraction collecting means with said feeding means for recirculating the collected separate fraction to said feeding means.

11. Apparatus as defined in claim 10 wherein said separate fraction collecting means includes means for varying the width of said separate fraction collecting means so that the portion of the separating body adjacent said discharge end from which said undersize fraction is separately collected may be varied.

12. Apparatus as defined in claim 7 wherein said separating body is mounted within a closed housing provided with feed and discharge openings and wherein means is provided for producing and maintaining substantially equal pressures above atmospheric pressure on both sides of said separating body within said housing.

13. Apparatus as defined in claim 7 wherein said feeding means comprises means for separately supplying a suspending liquid in layer formation in said defined direction of feed and a preceding separating body similar to the first-mentioned separating body having its discharge end positioned to discharge particles into the separately supplied layer formation of suspending liquid so as to be entrained thereby.

14. Apparatus as defined in claim 13 wherein the concave side of said first-mentioned separating body and said similar separating body face in substantially the same direction.

15. Apparatus as defined in claim 13 wherein the concave side of said first-mentioned separating body and said similar separating body face in substantially opposite directions.

16. Apparatus as defined in claim 7 wherein said feeding means comprises a feeding device and means mounting said feeding device for movement between a first operative position adjacent the feed end of said separating body and a second operative position adjacent the discharge end of said body whereby the particles and suspending liquid can be alternatively fed onto the feed end and discharge end of said separating body in said defined direction.

17. Apparatus as defined in claim 16 including a housing surrounding said separating body for receiving and discharging an undersize fraction passing through said apertures, and a second housing surrounding the feed and discharge ends of said body and said feeding device for receiving and discharging the particles and liquid discharging from the end of said separating body opposite to that which the particles and liquid are fed by said feeding device.

18. Apparatus as defined in claim 16 wherein said separating body extends through an angle of more than 180°, said ends extending generally downwardly and being in a symmetrical position with respect to a vertical plane parallel to said ends.

19. Apparatus as defined in claim 18 wherein said means for mounting said feeding device comprises pivot means for pivotally supporting said feeding device for movement between said operative positions about a horizontal axis disposed in said vertical plane.

(References on following page)

References Cited in the file of this patent

UNITED STATES PATENTS

| | | |
|---|---|---|
| 369,836 | Blackman | Sept. 13, 1887 |
| 828,715 | Cook | Aug. 14, 1906 |
| 1,135,304 | Liggett et al. | Apr. 13, 1915 |
| 1,333,127 | Nall | Mar. 9, 1920 |
| 1,428,392 | Ogden | Sept. 13, 1922 |
| 1,700,925 | Dezurik | Feb. 5, 1929 |
| 2,799,394 | Boogaard | July 16, 1957 |

FOREIGN PATENTS

| | | |
|---|---|---|
| 264,536 | Great Britain | Sept. 22, 1927 |
| 469,241 | Canada | Nov. 7, 1950 |
| 515,859 | Belgium | Dec. 15, 1952 |
| 523,268 | Belgium | Oct. 31, 1953 |

OTHER REFERENCES

Chemical Engineer's Handbook, edited by John H. Perry, First Edition, McGraw-Hill, 1934, page 1453, Fig. 10.

PO-1050
(5/69)

UNITED STATES PATENT OFFICE
CERTIFICATE OF CORRECTION

Patent No. 2,916,142         Dated December 8, 1959

Inventor(s)  Freerk J. Fontein

It is certified that error appears in the above-identified patent and that said Letters Patent are hereby corrected as shown below:

In the claims:

Column 13, line 44, change "separating" to --supporting-- .

Column 13, line 75, change "separating" to --supporting-- .

Column 14, line 9, change "separating" to --supporting-- .

SIGNED AND
SEALED
JUN 23 1970

(SEAL)
Attest:

Edward M. Fletcher, Jr.
Attesting Officer

WILLIAM E. SCHUYLER, JR.
Commissioner of Patents